United States Patent
Womack

(10) Patent No.: US 9,720,196 B2
(45) Date of Patent: Aug. 1, 2017

(54) BRIDGING CONNECTOR FOR ADJACENT SLIDING TRAYS

(71) Applicant: CommScope, Inc. of North Carolina, Hickory, NC (US)

(72) Inventor: Wade J. Womack, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 104 days.

(21) Appl. No.: 14/618,834

(22) Filed: Feb. 10, 2015

(65) Prior Publication Data
US 2016/0231524 A1    Aug. 11, 2016

(51) Int. Cl.
G02B 6/00    (2006.01)
G02B 6/44    (2006.01)
G02B 6/38    (2006.01)

(52) U.S. Cl.
CPC ......... *G02B 6/4452* (2013.01); *G02B 6/4455* (2013.01); *G02B 6/3897* (2013.01)

(58) Field of Classification Search
None
See application file for complete search history.

(56) References Cited

U.S. PATENT DOCUMENTS

| | | | |
|---|---|---|---|
| 1,951,972 A * | 3/1934 | Fraser | A47B 87/00 206/558 |
| 5,717,810 A | 2/1998 | Wheeler | |
| 5,978,540 A | 11/1999 | Bechamps et al. | |
| 8,195,022 B2 | 6/2012 | Coburn et al. | |
| 8,428,418 B2 | 4/2013 | Smrha | |
| 2010/0142910 A1 | 6/2010 | Hill et al. | |
| 2011/0044598 A1 * | 2/2011 | Srutkowski | G02B 6/4452 385/135 |
| 2012/0288249 A1 | 11/2012 | Ruiz | |
| 2014/0010510 A1 | 1/2014 | Blackard | |
| 2016/0077298 A1 * | 3/2016 | Wiltjer | G02B 6/4453 211/126.15 |

OTHER PUBLICATIONS

ADC Krone, Data Centre & Communications Room 19" Fibre Panel Solutions, 102588BE, TureNet(r) Structured Cabling, pp. 4.04-4.08, Oct. 2006, www.adckrone.com.

* cited by examiner

*Primary Examiner* — Tina Wong
*Assistant Examiner* — Chris Chu
(74) *Attorney, Agent, or Firm* — Muncy, Geissler, Olds & Lowe, P.C.

(57) ABSTRACT

A sliding tray unit for communication channel patching includes at least first and second horizontally adjacent sliding trays, with each tray including a platform with a bulkhead, with an area between the bulkhead and a front of the sliding tray being considered a trough. Lips are formed at forward edges of adjacent troughs. Each lip includes an indentation or hole. A bridging connector includes a gap formed between front and back walls. The lips fit into the gap. First and second projections formed on the back wall project into the gap and removably snap into the indentions/holes of the adjacent lips. The first and second sliding trays slide as a single unit with the bridging connector installed on both lips. The bridging connector may pivot about the engagement between a projection and its mating indentation/hole when the other projection is removed from its mating indentation/hole, so that the adjacent sliding trays may slide independently.

13 Claims, 7 Drawing Sheets

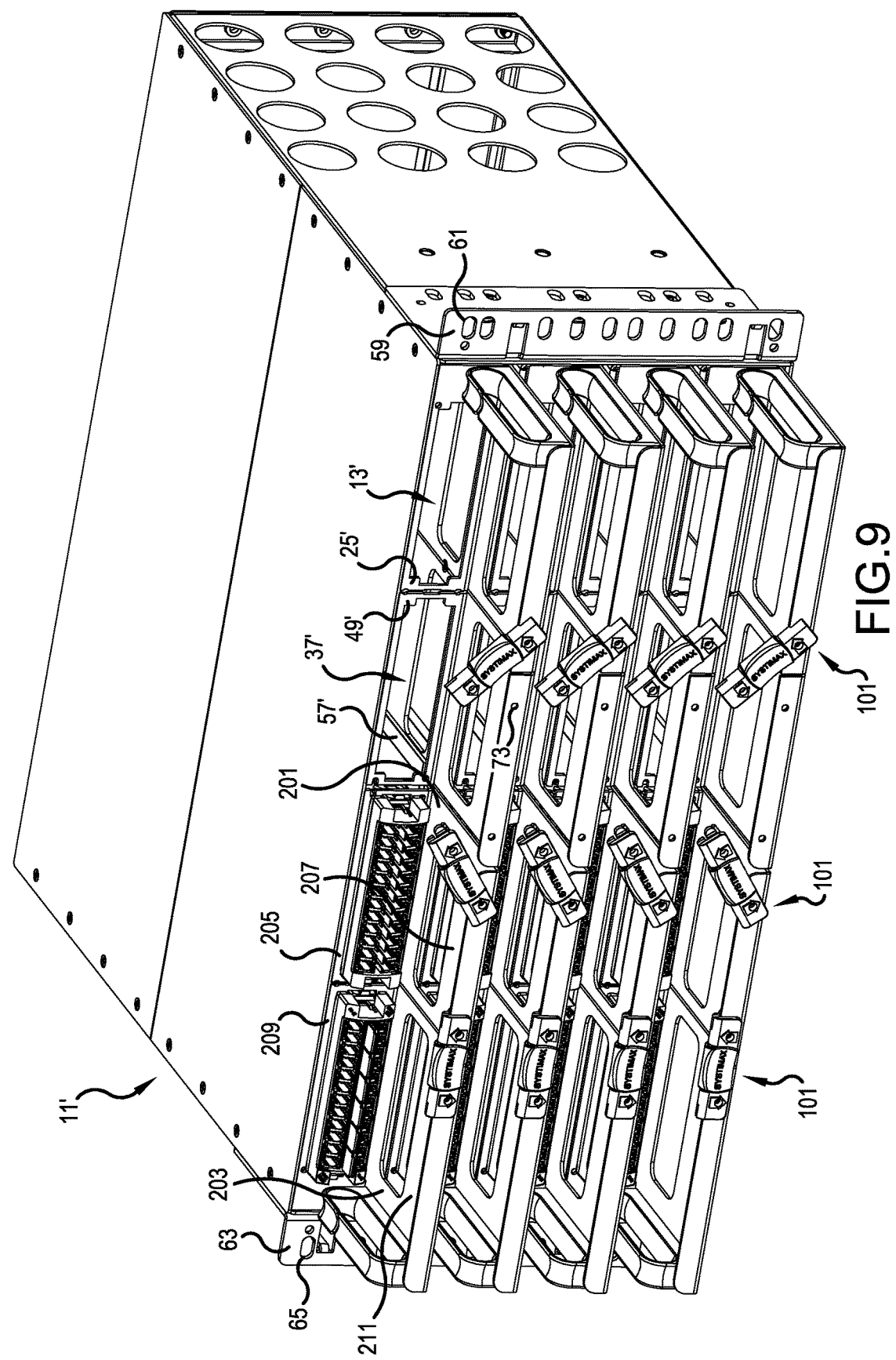

BRIDGING CONNECTOR FOR ADJACENT SLIDING TRAYS

BACKGROUND OF THE INVENTION

1. Field of the Invention

The present invention relates to a sliding tray unit for communication channel patching of the type commonly mounted in a rack system. More particularly, the present invention relates to a sliding tray unit having horizontal, adjacently placed trays, which may independently slide in and out of the rack system. The present invention also relates to a bridging connector, which may attach adjacent sliding trays so that they move in unison.

2. Description of the Related Art

Computer and/or telecommunications components, such as sliding trays holding plural patching modules or patching cassettes, are often mounted in a rack system and may be slidably connected to the rack, so that individual ones of the sliding trays can be pulled out from the front of the rack system for service or easier access, and then slid back into the rack system. Such sliding trays have cables connected to rear portions of patching modules thereon, which cables may contain optical fibers and/or electrical wires.

In a common fiber optic arrangement, plural modules or cassettes are attached to a bulkhead plate on a sliding tray. Each module has one or more multi-fiber ports on a rear face, such as two MPO ports. Many single fiber ports are mounted on a front face of the module, such as twenty-four LC ports or twelve LC duplex ports. Inside the module, each optical channel of the MPO port is fanned out and wound about fiber management spools or guides and optionally spliced, attenuated, combined or split, and then passed to one of the ports on the front face of the module.

Care must be taken when sliding a tray with plural modules in and out of a rack system, so that the cables do not become tangled with cables attached to other components or pinched between the moving components and another element and impede the sliding action of the tray. As for the optical fibers themselves, several potential drawbacks may occur each time a sliding tray is slid in or out, and adjacent fibers are tugged on or disturbed. For example, tugging on adjacent fibers can lead to micro-bends, a momentary or permanent disconnection of a signaling channel connector, splice damage, and/or exceeding the minimum bend radius of an optical fiber.

SUMMARY OF THE INVENTION

The Applicant has appreciated that improvements in a sliding tray unit for communication channel patching could lead to improved organization and appearance.

Further, the Applicant has appreciated that improvements in a sliding tray unit for communication channel patching could reduce the likelihood of the drawbacks visited on the optical fibers when the sliding trays of the sliding tray unit are inserted and withdrawn from the rail system to which the sliding tray unit is attached.

These and other objects are accomplished by a sliding tray unit for communication channel patching comprising: a first sliding tray having a first platform with a back, a front, a first side connecting said back to said front, and a second side connecting said back to said front, said first sliding tray also including a first bulkhead extending away from said first platform and also extending in a direction between said first side and said second side, wherein an area on said first platform between said first bulkhead and said front is considered a first trough for accommodating cabling; first primary guide features disposed on said first side of said first sliding tray for engaging first complimenting guide features; second primary guide features disposed on said second side of said first sliding tray for engaging second complimenting guide features, wherein said first sliding tray may slide in the back to front direction relative to said first and second complimenting guide features; a second sliding tray having a second platform with a back, a front, a first side connecting said back to said front, and a second side connecting said back to said front, said second sliding tray also including a second bulkhead extending away from said second platform and also extending in a direction between said first side and said second side, wherein an area on said second platform between said second bulkhead and said front is considered a second trough for accommodating cabling; third primary guide features disposed on said first side of said second sliding tray for engaging third complimenting guide features; and fourth primary guide features disposed on said second side of said second sliding tray for engaging fourth complimenting guide features, wherein said second sliding tray may slide in the back to front direction relative to said third and fourth complimenting guide features, wherein said second complimenting guide features are mounted proximate to said third complimenting guide features, and wherein said first platform of said first sliding tray is coplanar to said second platform of said second sliding tray.

Further, these and other objects are accomplished by a bridging connector for adjacent sliding trays comprising: a spine; a first wall connected to said spine; a second wall connected to said spine, wherein said second wall is spaced from said first wall by a gap dimensioned to accept a lip attached to a sliding tray; a first structure formed on said second wall and projecting into or recessing away from said gap, said first structure dimensioned to interact with a first feature of a first lip attached to a first sliding tray; and a second structure formed on said second wall and projecting into or recessing away from said gap, said second structure dimensioned to interact with a second feature of a second lip attached to a second sliding tray.

In sum, the Applicant has invented a sliding tray unit for communication channel patching, which includes at least first and second horizontally adjacent sliding trays, with each tray including a platform with a bulkhead, with an area between the bulkhead and a front of the sliding tray being considered a trough. Lips are formed at forward edges of adjacent troughs. Each lip includes an indentation or hole. A bridging connector includes a gap formed between front and back walls. The lips fit into the gap. First and second projections formed on the back wall project into the gap and removably snap into the indentions/holes of the adjacent lips. The first and second sliding trays slide as a single unit with the bridging connector installed on both lips. The bridging connector may pivot about the engagement between a projection and its mating indentation/hole when the other projection is removed from its mating indentation/hole, so that the adjacent sliding trays may slide independently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 9 is a perspective view of a sliding tray unit, in accordance with an alternative embodiment of the present invention.

DETAILED DESCRIPTION OF EMBODIMENTS OF THE INVENTION

Figure 1:
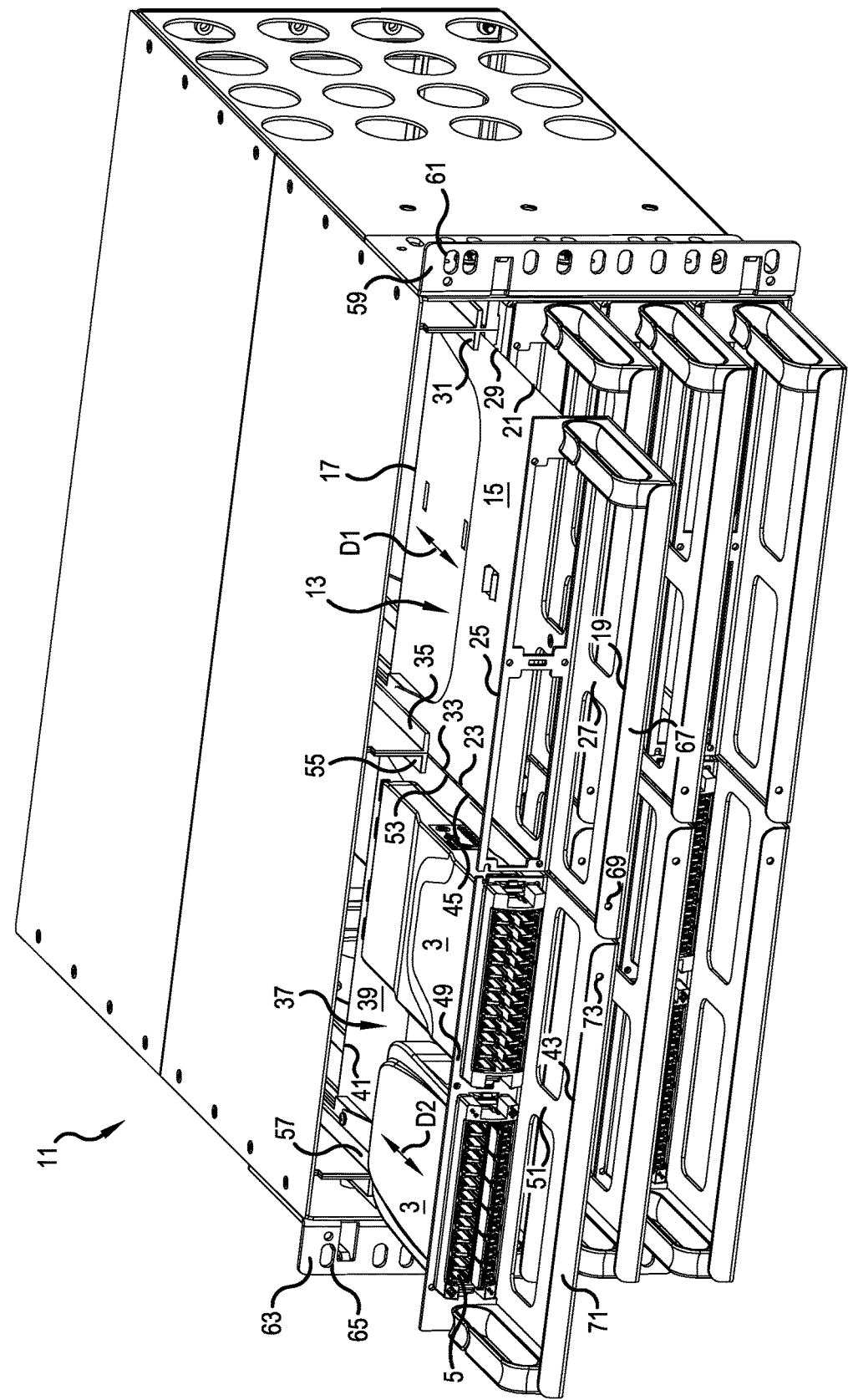
FIG. 1 is a perspective view of a sliding tray unit for communication channel patching, in accordance with the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 is a perspective view of a sliding tray unit 11 for communication channel patching. The sliding tray unit 11 includes four levels of sliding trays. The sliding trays in each level hold patching units 3. Each patching unit 3 has plural front ports 5 on a front face, such as LC ports, and one or more rear ports on a rear face, such as an MPO port. Inside each patching unit 3, optical fibers from the rear port are routed about fiber management devices, such as spools or guides. The optical fibers may optionally pass through splitters, combiners, attenuators, splices, etc. Many, if not all, of the optical fibers within the patching unit 3 ultimately terminate to one of the front ports 5 on the front face of the patching unit 3.

More information on the patching unit 3 and conventional sliding tray may be found in U.S. Pat. Nos. 8,428,418 and 8,195,022, and published U.S. Applications 2010/0142910 and 2014/0010510, all of which are herein incorporated by reference. Although FIG. 1 illustrates a sliding tray unit 11 of 4 U size with four levels of sliding trays, the sliding tray unit 11 may have different sizes and may be formed with more or fewer levels of sliding trays, such as a 2 U size with two levels of sliding trays, a 1 U size with one level of sliding trays, a 2 U size with one level of sliding trays, a 3 U size with two levels of sliding trays, a 4 U size with five levels of sliding trays, etc.

The sliding tray unit 11 includes a first sliding tray 13 having a first platform 15 with a back 17, a front 19, a first side 21 connecting the back 17 to the front 19, and a second side 23 connecting the back 17 to the front 19. The first sliding tray 13 also includes a first bulkhead 25 extending away from the first platform 15. The first bulkhead 25 also extends in a direction between the first side 21 and the second side 23. An area on the first platform 15, between the first bulkhead 25 and the front 19, is considered a first trough 27 for accommodating cabling leading to connectors within the front ports 5 of the patching units 3.

First primary guide features 29 are disposed on the first side 21 of the first sliding tray 13. The first primary guide features 29 engage first complimenting guide features 31 attached to the sliding tray unit 11. Second primary guide features 33 are disposed on the second side 23 of the first sliding tray 13. The second primary guide features 33 engage second complimenting guide features 35 attached to the sliding tray unit 11. The engagements allow the first sliding tray 13 to slide in the back to front direction D1 relative to the first and second complimenting guide features 31 and 35.

The sliding tray unit 11 also includes a second sliding tray 37 having a second platform 39 with a back 41, a front 43, a first side 45 connecting the back 41 to the front 43, and a second side (configured like the second side 23 of the first sliding tray 13) connecting the back 41 to the front 43. The second sliding tray 37 also includes a second bulkhead 49 extending away from the second platform 39. The second bulkhead 49 also extends in a direction between the first side 45 and the second side. An area on the second platform 39, between the second bulkhead 49 and the front 43, is considered a second trough 51 for accommodating cabling leading to connectors within the front ports 5 of the patching units 3.

Third primary guide features 53 are disposed on the first side 45 of the second sliding tray 37. The third primary guide features 53 engage third complimenting guide features 55 attached to the sliding tray unit 11. Fourth primary guide features (configured like the second primary guide features 33 of the first sliding tray 13) are disposed on the second side of the second sliding tray 37. The fourth primary guide features engage fourth complimenting guide features 57 attached to the sliding tray unit 11. The engagements allow the second sliding tray 37 to slide in the back to front direction D2 relative to the third and fourth complimenting guide features 55 and 57.

The second complimenting guide features 35 are mounted proximate to, e.g., directly beside, the third complimenting guide features 55. Further, the first platform 15 of the first sliding tray 13 is coplanar or parallel to the second platform 39 of the second sliding tray 37. In sum, the first sliding tray 13 is side-by-side with the second sliding tray 37 within the sliding tray unit 11.

The sliding tray unit 11 includes a first flange 59 mounted proximate to the first complimenting guide features 31. The first flange includes a first mounting hole 61 for alignment to a first corresponding hole in a first rack rail. The sliding tray unit 11 also includes second flange 63 mounted proximate to the fourth complimenting guide features 57. The second flange 63 includes a second mounting hole 65 for alignment to a second corresponding hole in a second rack rail. A distance between the first mounting hole 61 and the second mounting 65 is approximately nineteen inches. Nineteen inches is the standard length between the first and second rails of a telecommunications rack system. Of course, the distance between the first and second mounting holes 61 and 65 may be longer or shorter depending upon the distance between the first and second rails of a rack system. The "rack system" is also intended to encompass racks or mounting feature layouts formed within or attached to opposite sides of shelves or cabinets.

A first lip 67 is formed at a forward edge of the first trough 27, e.g., at the forward edge 19 of the first platform 15. The first lip 67 includes a first feature 69, such as an indentation or hole. A second lip 71 is formed at a forward edge of the second trough 51. The second lip 71 includes a second feature 73, such as an indentation or hole.

In a preferred embodiment, the first lip 67 extends away from the first trough 27 at approximately a ninety degree angle, and the second lip 71 extends away from the second trough 51 at approximately a ninety degree angle. Further, in the preferred embodiment, the first feature 69 is a first through hole formed in the first lip 67, and the second feature 73 is a second through hole formed in the second lip 71.

Figure 2:
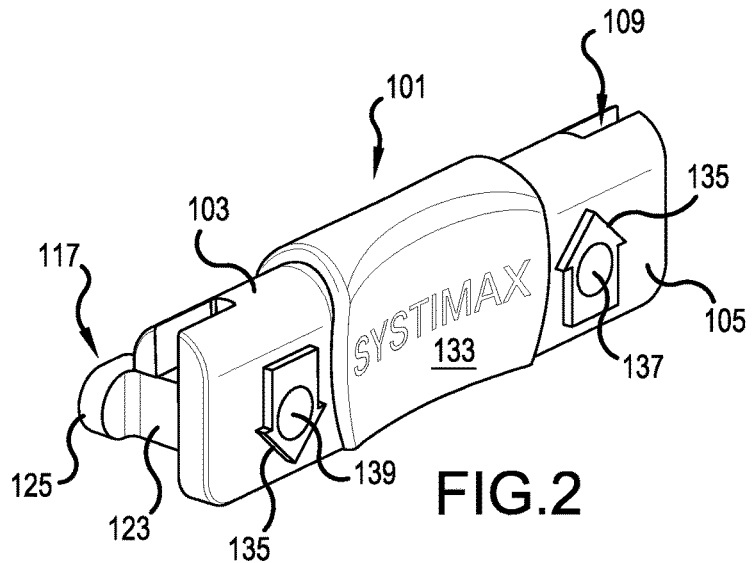
FIG. 2 is a front, left side, perspective view of a bridging connector for adjacent sliding trays, in accordance with the present invention.
Figure 3:
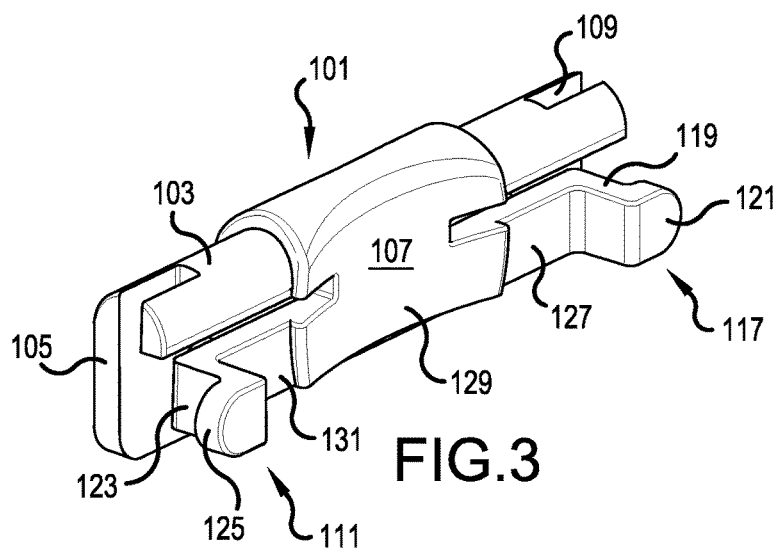
FIG. 3 is a rear, right side, perspective view of the bridging connector of FIG. 2.
Figure 4:
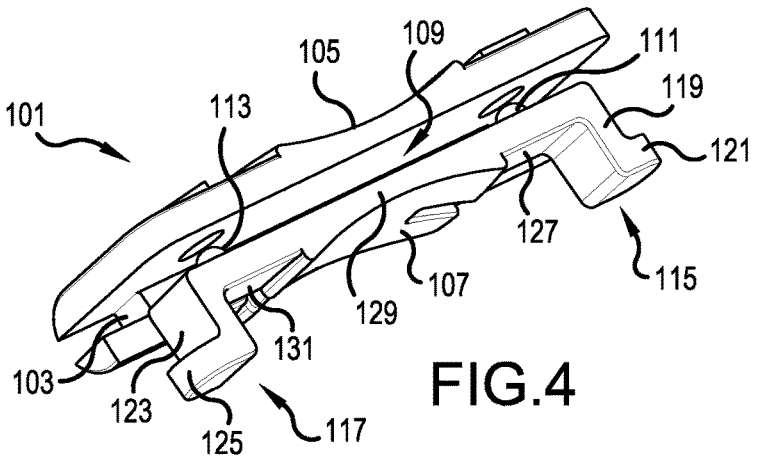
FIG. 4 is a rear, left side, perspective view of a bottom of the bridging connector of FIG. 2.

FIG. 2 is a front, left side, perspective view of a bridging connector 101 for adjacent sliding trays, in accordance with the present invention. FIG. 3 is a rear, right side, perspective view of the bridging connector 101 of FIG. 2, and FIG. 4 is a rear, left side, perspective view of a bottom of the bridging connector 101 of FIG. 2.

The bridging connector 101 includes a spine 103. A first or front wall 105 is connected to the spine 103, and a second or back wall 107 is connected to the spine 103. The back wall 107 is spaced from the front wall 105 by a gap 109. The gap 109 is dimensioned to accept the first lip 67 attached to the first sliding tray 13 and/or the second lip 71 attached to the second sliding tray 37.

A first structure is formed on the back wall 107 and projects into the gap 109 or recesses away from the gap 109. In a preferred embodiment, the first structure is a first projection 111 and projects into the gap 109 toward the front wall 105. The first structure is dimensioned to interact with the first features 69 of the first lip 67. In the case of the first projection 111, the first projection 111 extends at least partially into the first feature 69 of the first lip 67 attached to the first sliding tray 13. Likewise, a second structure, e.g., a second projection 113, is formed on the back wall 107 and projects into the gap 109 toward said front wall 105. The second structure, e.g., second projection 113, is dimensioned to interact with, e.g., extend at least partially into, the second feature 73 of the second lip 71 attached to the second sliding tray 37.

A first handle 115 is attached to a first lateral side of the back wall 107 proximate the first projection 111. A second handle 117 is attached to a second lateral side of the back wall 107 proximate the second projection 113, wherein the second lateral side is opposite to the first lateral side.

The first handle 115 includes a first standoff 119 attached to the back wall 107 and extending in a direction away from the gap 109 and the front wall 105, such as at an angle of approximately ninety degrees. The first standoff 119 could extend a distance of about ¼ to ½ inches. The first handle 115 also includes a first finger tab 121 projecting at an angle to the first standoff 119, such as at an angle of approximately ninety degrees. The first handle 115 could project a distance of about ¼ to ½ inches.

The second handle 117 includes a second standoff 123 attached to the back wall 107 and extending in a direction away from the gap 109 and the front wall 105, such as at an angle of approximately ninety degrees. The second standoff 123 could extend a distance of about ¼ to ½ inches. The second handle 117 also includes a second finger tab 125 projecting at an angle to the second standoff 123, such as at an angle of approximately ninety degrees. The second handle 117 could project a distance of about ¼ to ½ inches.

A first portion 127 of the back wall 107 between the first standoff 119 and a middle 129 of the back wall 107 is formed as a first lever having flexibility to allow the first projection 111 to disengage from the first feature 69 of the first lip 67 attached to the first sliding tray 13, when the first finger tab 121 is pulled in a direction away from the front wall 105. A second portion 131 of the back wall 107 between the second standoff 123 and the middle 129 of the back wall 107 is formed as a second lever having flexibility to allow the second projection 113 to disengage from the second feature 73 of the second lip 71 attached to the second sliding tray 37, when the second finger tab 125 is pulled in a direction away from the front wall 105.

In one embodiment, the entire bridging connector 101 is formed of a one-piece molded first polymer. In a preferred embodiment, at least a portion of the front wall 105 is over molded with a second polymer, softer than the first polymer, to produce a gripping surface 133. The gripping surface may include indicia, such as a trademark, a logo or instructions, such as arrows 135 to indicate the intended movement directions of the bridging connector 101. The rear wall 107 may also be over molded with the softer polymer, or the entire bridging connector 101 may be over molded with the softer polymer.

In a preferred embodiment, the first and second projections are formed as rounded domes, and first and second holes 137 and 139 are formed through the front wall 105. The first hole 137 is aligned to the first projection 111, such that the first projection 111 may be viewed through the first hole 137. The second hole 139 is aligned to the second projection 113, such that the second projection 113 may be viewed through the second hole 139. The rounded dome shapes of the first and second projections 111 and 113 facilitate installation, removal and operation of the bridging connector 101, as will be described next. The ability to view the first and second projections 111 and 113 through the first and second holes 137 and 139 permits a user to verify that the bridging connector 101 has been properly installed, as will be described next, and also facilitates the molding process for the bridging connector 101.

Although the bridging connector 101 is preferably formed of a molded polymer, it would also be possible to form the bridging connector 101 of other materials. For example, the bridging connector 101 could be formed of metal, and the first and second portions 127 and 131 could be formed of a resilient spring metal to allow the first and second projections 111 and 113 to retract and return to their natural positions. Alternatively, the entire bridging connector 101 could be formed of a fairly rigid metal and the first and second projections 111 and 113 could be spring-biased domes captured within respective pockets formed in the rear wall 107 and capable of retracting into their respective pockets in the rear wall 107 against the spring biasing forces. Of course, other configurations and materials may be used to form the bridging connector 101 and are intended to be within the scope of the appended claims.

Figure 5:
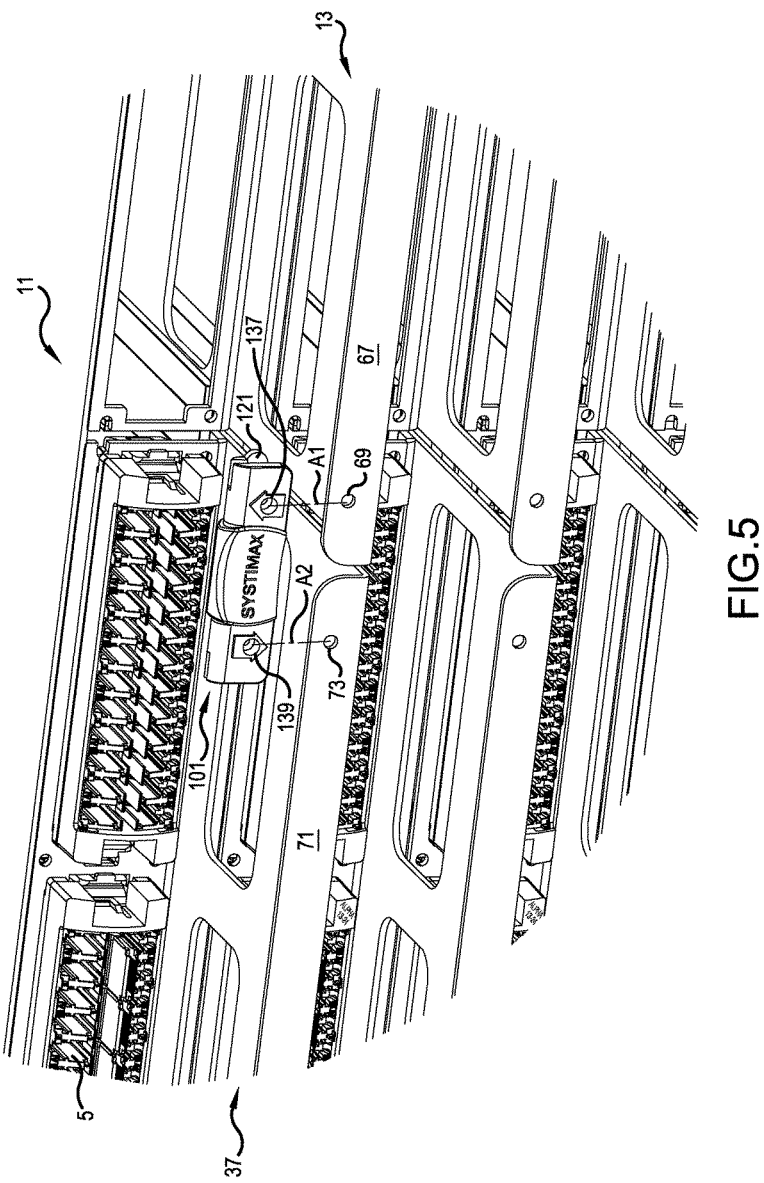
FIG. 5 is a close-up view of a portion of the sliding tray unit 11 of FIG. 1 with the bridging connector of FIGS. 2-4 ready to be installed on first and second lips of adjacent sliding trays.

FIG. 5 is a close-up view of a portion of the sliding tray unit 11 of FIG. 1 with the bridging connector 101 of FIGS. 2-4 ready to be installed on the first and second lips 67 and 71 of the first and second sliding trays 13 and 37. The user aligns the first and second holes 137 and 139 with the first and second features 69 and 73 of the first and second lips 67 and 71, as indicated by the first and second dashed alignment indicator lines A1 and A2, respectively. The user then lowers the bridging connector 101, while permitting the first and second lips 67 and 71 to enter into the gap 109 of bridging connector 101.

Figure 6:
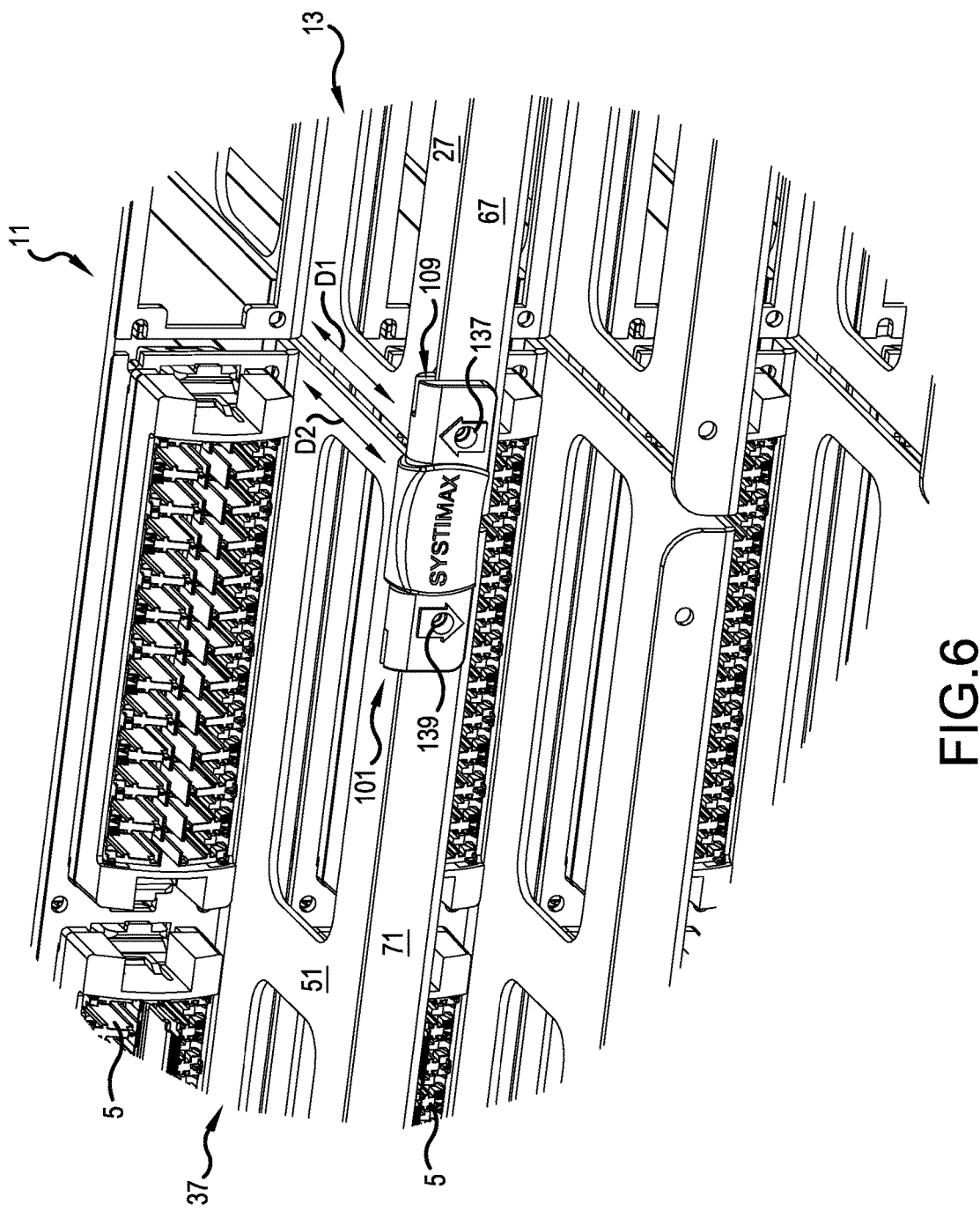
FIG. 6 is a close-up view, similar to FIG. 5, showing the bridging connector installed on the first and second lips of the adjacent sliding trays for simultaneous sliding of the adjacent sliding trays.

Just as, or just before, the bridging connector 101 fully seats onto the first and second lips 67 and 71, the first and second projections 111 and 113 will snap into the first and second features 69 and 73 of the first and second lips 67 and 71. FIG. 6 is a close-up view, similar to FIG. 5, but showing the bridging connector 101 installed on the first and second lips 67 and 71. Once installed, a user may verify that the bridging connector 101 has been properly seated by looking into the first and second holes 137 and 139. If a portion of the first or second lips 67 or 71 is visible, the first or second projections 111 or 113 have not snapped into the first or second features 69 or 73 of the first or second lips 67 and 71. If only the first and second projections 111 and 113 are visible through the first and second holes 137 and 139, the bridging connector 101 has properly seated and connected the first sliding tray 13 to the second sliding tray 37. When properly seated, as depicted in FIG. 6, the first and second sliding trays 13 and 37 slide in the back to front directions D1 and D2 as a single unit.

In use, a technician may desire to have the bridging connector 101 seated, as shown in FIG. 6, so that the first and second sliding trays 13 and 37 function as one sliding tray between the first rack rail and the second rack rail, as is typical in the industry. However, the connection is not permanent because the first projection 111 is removably snapped into the first feature 69 of the first lip 67, and the second projection 113 is removably snapped into the second feature 73 of the second lip 71. The domed shape of the first and second projections 111 and 113 greatly assists in dislodgement from the first and second features 69 and 73.

Figure 7:
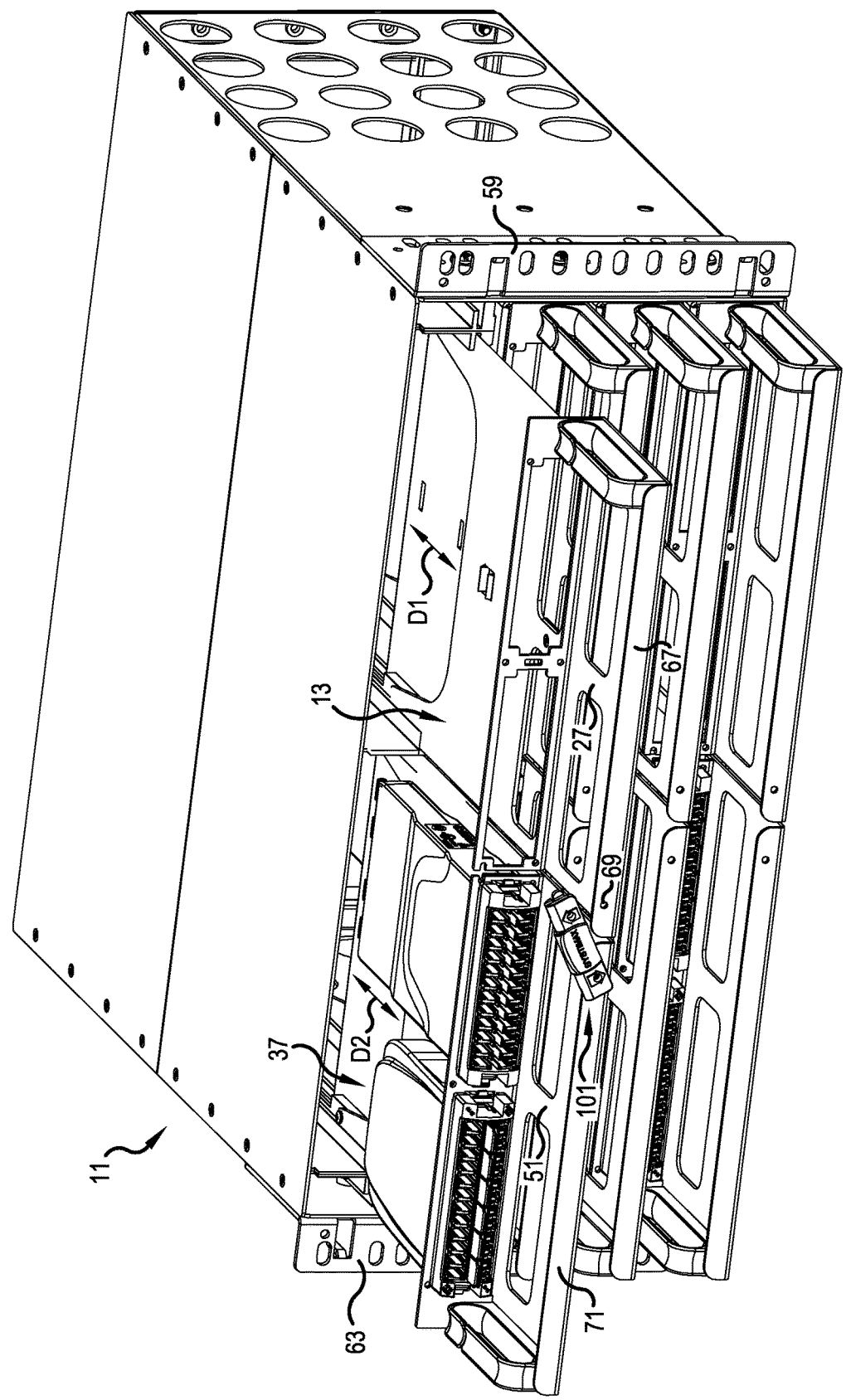
FIG. 7 is a perspective view of the sliding tray unit of FIG. 1 with the bridging connector configured for independent sliding of the adjacent sliding trays.
Figure 8:
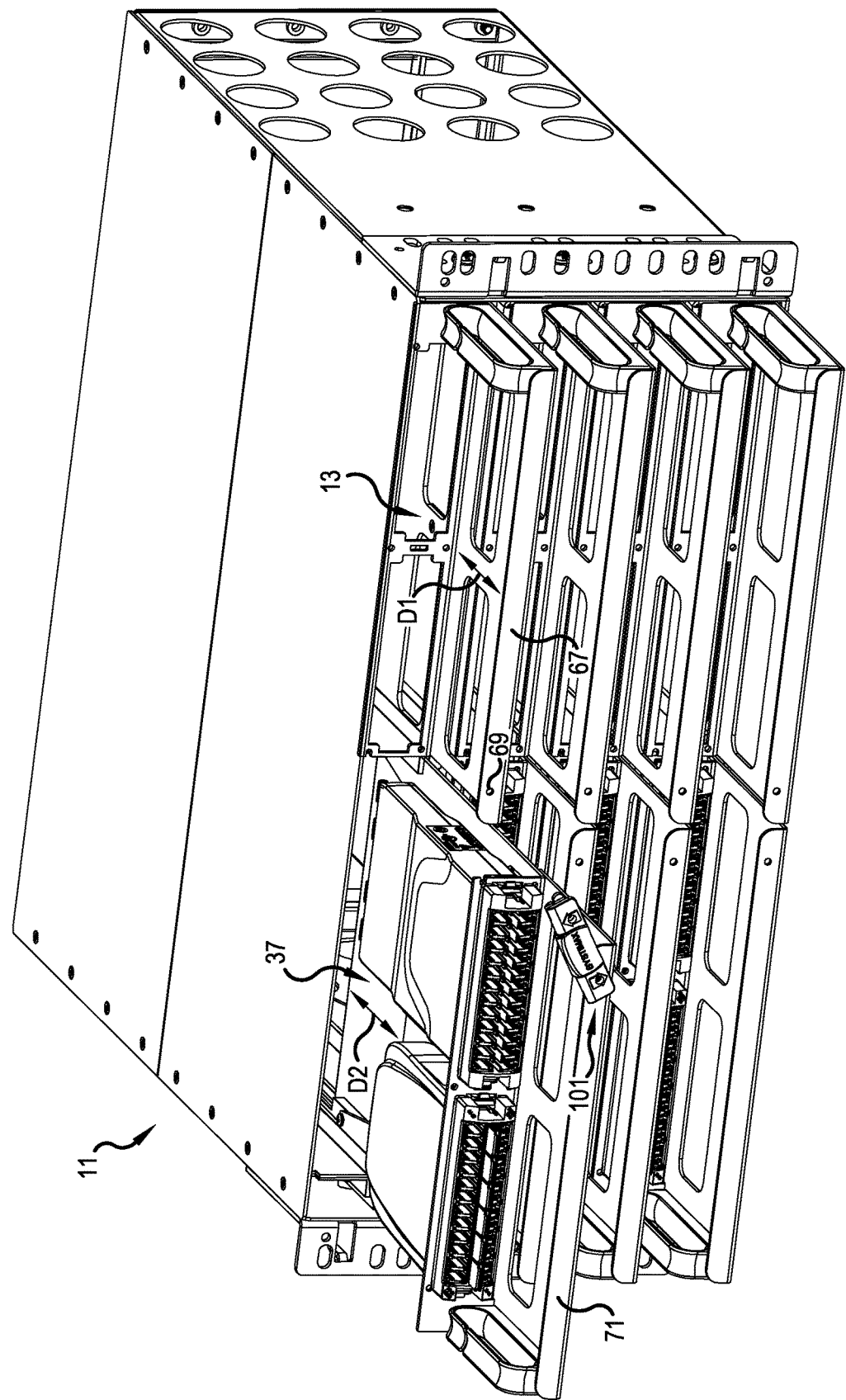
FIG. 8 is a perspective view of the sliding tray unit of FIG. 7 showing one sliding tray extended and an adjacent sliding tray retracted.

In FIG. 7, the first projection 111 is manually dislodged from the first feature 69, and the bridging connector 101 is manually pivoted about the engagement between the second projection 113 and the second feature 73. Once the bridging connector 101 is pivoted to an extent that the first lip 67 is clear of the gap 109, the first sliding tray 13 may slide independently of the second sliding tray 37 in the back to front direction D1. For example, FIG. 8 illustrates the first sliding tray 13 in a fully retracted position, while the second sliding tray 37 remains in a fully extended position. Of course, the second sliding tray 37 may be slid independent of the first sliding tray 13 in the configuration of FIG. 8, and hence may be slid in the direction D2 to its fully retracted position as well, if desired.

This split arrangement provides more flexibility to the user, as only a desired first or second sliding tray 13 or 37 needs to be pulled out, e.g., extended, for service, while the other of the first or second sliding trays 13 or 37 can remain seated, e.g., retracted, in the rack unit. Leaving a sliding tray seated reduces the chance of disconnects, micro bending a fiber, exceeding a fiber's minimum bend radius, damage due to snagging, etc.

Although FIGS. 1 and 5-8 have depicted a sliding tray unit 11 having first and second sliding trays 13 and 37 in a horizontally adjacent and coplanar relationship between first and second rack rails, it would be possible to practice the advantages of the present invention with more sliding trays in a horizontally adjacent and co-planar relationship, such as three, four, five or more adjacent co-planar sliding trays. Further, the platforms need not be exactly co-planar, as one or more platforms may be elevated relative to the other side-by-side platforms. FIG. 9 depicts four sliding trays in a horizontally adjacent and co-planar relationship within a modified sliding tray unit 11'.

More specifically, FIG. 9 shows a modified first sliding tray 13' adjacent to a modified second sliding tray 37', which is in turn adjacent to a third sliding tray 201, which is in turn adjacent to a fourth sliding tray 203. The modified first and second sliding trays 13' and 37' are constructed the same as the first and second sliding trays 13 and 37 described above, except that the width is shortened by approximately ½.

The third sliding tray 201 and fourth sliding tray 203 are formed as mirror images of the second and first modified sliding trays 37' and 13', respectively. Namely, the third sliding tray 201 includes a third platform with a back, a front, a first side connecting the back to the front, and a second side connecting the back to the front. The third sliding tray 201 also including a third bulkhead 205 extending away from the third platform and also extending in a direction between the first side and the second side, wherein an area on the third platform between the third bulkhead 205 and the front is considered a third trough 207 for accommodating cabling.

Fifth primary guide features disposed on the first side of the third sliding tray 201 for engaging fifth complimenting guide features. Sixth primary guide features disposed on the second side of the third sliding tray for engaging sixth complimenting guide features. The third sliding tray 201 may slide in the back to front direction relative to said fifth and sixth complimenting guide features. The fourth complimenting guide features 57' are mounted proximate to the fifth complimenting guide features. The second platform of the second sliding tray 37' is coplanar to the third platform of the third sliding tray 201.

The fourth sliding tray 203 has a fourth platform with a back, a front, a first side connecting the back to the front, and a second side connecting the back to the front. The fourth sliding tray also includes a fourth bulkhead 209 extending away from the fourth platform and also extending in a direction between the first side and the second side. An area on the fourth platform between the fourth bulkhead 209 and the front is considered a fourth trough 211 for accommodating cabling.

Seventh primary guide features are disposed on the first side of the fourth sliding tray for engaging seventh complimenting guide features. Eighth primary guide features are disposed on the second side of the fourth sliding tray for engaging eighth complimenting guide features. The fourth sliding tray 203 may slide in the back to front direction relative to the seventh and eighth complimenting guide features. The sixth complimenting guide features are mounted proximate to the seventh complimenting guide features. The third platform of the third sliding tray 201 is coplanar to the fourth platform of the fourth sliding tray 203.

In the embodiment of FIG. 9, the first flange 59 is mounted proximate to the first complimenting guide features. The first flange 59 includes the first mounting hole 61 for alignment to a first corresponding hole in a first rack rail. The second flange 63 is mounted proximate to the eighth complimenting guide features. The second flange 63 includes a second mounting hole 65 for alignment to a second corresponding hole in a second rack rail. The distance between the first mounting hole 61 and the second mounting hole 65 remains at approximately 19 inches.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A combination comprising a bridging connector for adjacent sliding trays, said bridging connector including:
    a spine;
    a first wall connected to said spine;
    a second wall connected to said spine, wherein said second wall is spaced from said first wall by a gap dimensioned to accept a lip attached to a sliding tray;
    a first structure formed on said second wall and projecting into or recessing away from said gap, said first structure dimensioned to interact with a first feature of a first lip attached to a first sliding tray; and
    a second structure formed on said second wall and projecting into or recessing away from said gap, said second structure dimensioned to interact with a second feature of a second lip attached to a second sliding tray.

2. The combination according to claim 1, further comprising:
    a first handle attached to a first lateral side of said second wall proximate said first structure; and
    a second handle attached to a second lateral side of said second wall proximate said second structure, wherein said second lateral side is opposite to said first lateral side.

3. The combination according to claim 2,
    wherein said first handle includes a first standoff attached to said second wall and extending in a direction away from said gap and said first wall, and said first handle further includes a first finger tab projecting at an angle to said first standoff; and
    wherein said second handle includes a second standoff attached to said second wall and extending in a direction away from said gap and said first wall, and said second handle further includes a second finger tab projecting at an angle to said second standoff.

4. The combination according to claim 2,
    wherein a first portion of said second wall between said first handle and a middle of said second wall is formed as a first lever having flexibility to allow said first structure to disengage from the first feature of the first lip attached to the first sliding tray; and
    wherein a second portion of back second wall between said second handle and said middle of said second wall is formed as a second lever having flexibility to allow said second structure to disengage from the second feature of the second lip attached to the second sliding tray.

5. The combination according to claim 1, wherein said bridging connector is formed of a one-piece molded, first polymer.

6. The combination according to claim 5, wherein at least a portion of said first wall is over molded with a second polymer, softer than said first polymer, to produce a gripping surface.

7. The combination according to claim 1, further comprising:
    first and second holes formed through said first wall, wherein said first hole is aligned to said first structure, such that said first structure may be viewed through said first hole, and wherein said second hole is aligned to said second structure, such that said second structure may be viewed through said second hole.

8. The combination according to claim 1, wherein said first and second structures are formed as rounded domes projecting into said gap.

9. The combination according to claim 1, further comprising a sliding tray unit for communication channel patching, said sliding tray unit including:
- the first sliding tray having a first platform with a back, a front, a first side connecting said back to said front, and a second side connecting said back to said front, said first sliding tray also including a first bulkhead extending away from said first platform and also extending in a direction between said first side and said second side, wherein an area on said first platform between said first bulkhead and said front is considered a first trough for accommodating cabling;
- first primary guide features disposed on said first side of said first sliding tray for engaging first complimenting guide features;
- second primary guide features disposed on said second side of said first sliding tray for engaging second complimenting guide features, wherein said first sliding tray may slide in the back to front direction relative to said first and second complimenting guide features;
- the second sliding tray having a second platform with a back, a front, a first side connecting said back to said front, and a second side connecting said back to said front, said second sliding tray also including a second bulkhead extending away from said second platform and also extending in a direction between said first side and said second side, wherein an area on said second platform between said second bulkhead and said front is considered a second trough for accommodating cabling;
- third primary guide features disposed on said first side of said second sliding tray for engaging third complimenting guide features; and
- fourth primary guide features disposed on said second side of said second sliding tray for engaging fourth complimenting guide features, wherein said second sliding tray may slide in the back to front direction relative to said third and fourth complimenting guide features, wherein said second complimenting guide features are mounted proximate to said third complimenting guide features, and wherein said first platform of said first sliding tray is coplanar or parallel to said second platform of said second sliding tray, so that said first and second sliding trays are considered adjacent;
- wherein the first lip is formed at a forward edge of said first trough, and said first lip includes the first feature; and
- wherein the second lip is formed at a forward edge of said second trough, and said second lip includes the second feature.

10. The combination according to claim 9, wherein said first structure is a first projection and is removably snapped into said first feature of said first lip, and said second structure is a second projection and is removably snapped into said second feature of said second lip.

11. The combination according to claim 10, wherein said first and second sliding trays slide in the back to front direction as a single unit when said first projection is snapped into said first feature of said first lip and said second projection is snapped into said second feature of said second lip.

12. The combination according to claim 10, wherein said bridging connector may pivot about the engagement between said second projection and said second feature when said first projection is removed from said first feature, and may pivot to an extent that said first lip is clear of said gap so that said first sliding tray may slide independently of said second sliding tray in the back to front direction.

13. The combination according to claim 10, wherein said first lip extends away from said first trough at approximately a ninety degree angle, wherein said second lip extends away from said second trough at approximately a ninety degree angle, wherein said first feature is a first through hole formed in said first lip, and wherein said second feature is a second through hole formed in said second lip.

* * * * *

UNITED STATES PATENT AND TRADEMARK OFFICE
CERTIFICATE OF CORRECTION

| | | |
|---|---|---|
| PATENT NO. | : 9,720,196 B2 | Page 1 of 1 |
| APPLICATION NO. | : 14/618834 | |
| DATED | : August 1, 2017 | |
| INVENTOR(S) | : Wade J. Womack | |

It is certified that error appears in the above-identified patent and that said Letters Patent is hereby corrected as shown below:

In the Claims

Column 10, Line 44, In Claim 4, the word "back" should read --said--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*